Figure 1:
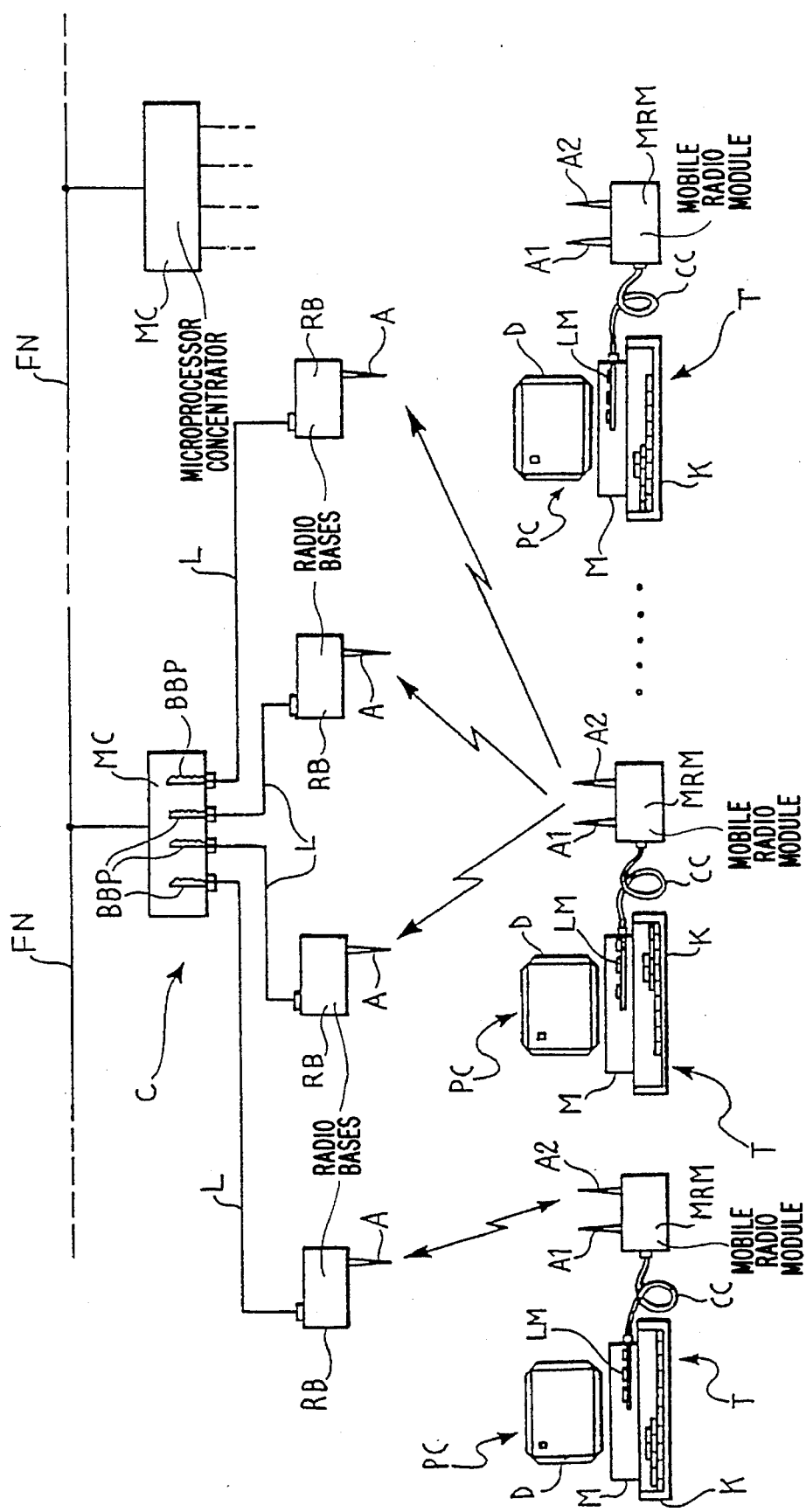

United States Patent [19]
Bud et al.

[11] Patent Number: 5,598,407
[45] Date of Patent: Jan. 28, 1997

[54] CORDLESS LOCAL AREA NETWORK HAVING A FIXED CENTRAL CONTROL DEVICE

[75] Inventors: Andrew Bud, Ivrea; Rino Furno, Zimone, both of Italy

[73] Assignee: Sixtel S.p.A., Ivrea, Italy

[21] Appl. No.: 211,489

[22] PCT Filed: Sep. 28, 1992

[86] PCT No.: PCT/EP92/02230

§ 371 Date: Jun. 2, 1994

§ 102(e) Date: Jun. 2, 1994

[87] PCT Pub. No.: WO93/07684

PCT Pub. Date: Apr. 15, 1993

[30] Foreign Application Priority Data

Oct. 7, 1991 [IT] Italy ................... TO91A0757

[51] Int. Cl.⁶ ........................................... H04J 4/00
[52] U.S. Cl. .................... 370/330; 455/54.1; 455/56.1
[58] Field of Search ................... 370/50, 94.1, 60, 370/85.12, 85.13, 95.1, 95.2, 95.3, 77–79, 100.1, 104.1; 375/8, 354, 356; 455/33.1–33.4, 56.1, 54.2, 5.1, 11.1, 13.1, 51.1, 54.1; 379/59, 60

[56] References Cited

U.S. PATENT DOCUMENTS

| | | | |
|---|---|---|---|
| 4,425,664 | 1/1984 | Sherman et al. | 375/8 |
| 4,665,519 | 5/1987 | Kirchner et al. | |
| 5,079,628 | 1/1992 | Tomikawa. | |

FOREIGN PATENT DOCUMENTS

| | | |
|---|---|---|
| 0257947 | 3/1988 | European Pat. Off. . |
| 3716318 | 11/1988 | Germany . |
| 0260252 | 2/1990 | Japan . |
| 2125257 | 2/1984 | United Kingdom . |

OTHER PUBLICATIONS

Patent Abstracts of Japan, vol. 14, No. 229 (copy not included with this IDS).
"Digital European Cordless Telecommnications Services and Facilities", ETSI DI/RES 3002 May 1991.
"Data Services in DECT", A Bud, Fifth International IEE Conference on Mobile Radio & Personal Communications, Dec. 1989.

Primary Examiner—Douglas W. Olms
Assistant Examiner—Dang Ton
Attorney, Agent, or Firm—Banner & Witcoff, Ltd.

[57] ABSTRACT

The network enables data to be communicated by radio, in accordance with the Digital European Cordless Telecommunications (DECT) standard, between a plurality of user stations (T), through a central control device (C). Each user station (T) comprises a data terminal (PC), a mobile radio module (MRM) and an adaptor device (LM) which acts as an interface between the data terminal (PC) and the mobile radio module (MRM). The central control device (C) comprises a microprocessor concentrator (MC) and a plurality of radio modules or bases (RB) connected to the microprocessor concentrator (MC) by connecting lines (L).

18 Claims, 4 Drawing Sheets

CORDLESS LOCAL AREA NETWORK HAVING A FIXED CENTRAL CONTROL DEVICE

The present invention relates to a local area network (a LAN) and, more specifically, to a network of the cordless. (or wireless) type, to enable data to be communicated by radio between a plurality of user stations each comprising a respective data terminal, by means of a fixed central control device.

Local networks have become increasingly widespread in the informatics and telematics world for short-range connections for enabling the transmission and distribution of data and services between a plurality of users within the same area, for example, in the same building. A local network enables many data terminals of different kinds, such as personal computers (PCs), minicomputers, printers, etc. to be connected in an extremely flexible manner, enabling very fast transmission speeds of the order of hundreds of thousands of Kbits/sec.

Up to now, most local networks have been of the wired type, that is, of the type in which the connections between the user stations and the central control devices are formed entirely by wires.

The appearance on the market of portable computers such as laptop personal computers, has created a need for cordless LANs.

A cordless local area network reduces installation costs because it eliminates the need to install connecting cables. This type of network can also be formed in situations in which it would be difficult or impossible to install connecting wires, such as, in buildings which do not have sockets for LANs or in which there are architectural constraints.

A cordless LAN network may represent the ideal solution in an organisation in which the positions of the user stations or the number of stations connected in the network are subject to frequent changes or modifications.

A cordless LAN also represents the ideal solution for organisations which are subject to frequent changes of location. In this case, it would in fact be neither practical nor economical to transfer a wired LAN.

Finally, as stated above, a LAN network enables data to be communicated even by portable personal computers, without limiting the mobility of these new devices.

The network according to the invention operates particularly in accordance with the DECT (Digital European Cordless Telecommunications) standard developed by ETSI—the European Telecommunications Standards Institute—which defines the specifications for radio connections between users and a network in a private environment.

The DECT system operates in the band between 1880 MHz and 1900 MHz and provides for radio transmission by means of a hybrid time and frequency multiplex system.

The characteristics of the DECT standard are described, for example, in "Digital European Cordless Telecommunications Services and Facilities", ETSI DI/RES 3002, May 1991 and in "Data Services in DECT", A. Bud, Fifth International IEE Conference on Mobile Radio, Warwick, December 1989.

A cordless LAN employing radio to communicate between a plurality of user stations each comprising a respective data terminal, by means of a fixed central control device which controls communications between the data terminals in accordance with a predetermined communication standard, is disclosed in EP-A-0 257 947. In this known cordless LAN each data terminal is associated with a separate and distinct fixed radio transceiver and the central control device is connected to the fixed radio bases.

Network systems for transmitting data by radio signals between a head end unit and a plurality of work stations are disclosed in PATENT ABSTRACTS OF JAPAN, Vol. 14, No. 229 (E-928), 4172, 15 May 1990 and JP-A-0260252.

The object of the invention is to provide a new and improved cordless radio local area network (LAN).

This object is achieved according to the invention with a cordless local area network having the features defined in the attached claim 1.

Typically, the data-terminals of the user stations may, for example, be personal computers and the microprocessor adaptor device is conveniently produced in the form of a "half-size"-format card or daughter board incorporated in the PC and connected to the bus thereof. The electrical supply for the adaptor is thus conveniently derived from the data-terminal bus.

Moreover, the transmitter/receiver radio module to advantage takes its electrical supply from the associated adaptor board by means of conductors which extend through the flexible multicore cable connecting it to the board.

To advantage, each user station radio transmitter/receiver module has two omnidirectional antennae for achieving space "diversity" to improve the characteristics of the radio connection with the fixed radio modules or bases.

Conveniently, but not necessarily, the fixed central control device may be arranged for connection to a fixed network, for example, an Ethernet network or a Token Ring or RS232 network.

Figure 2:
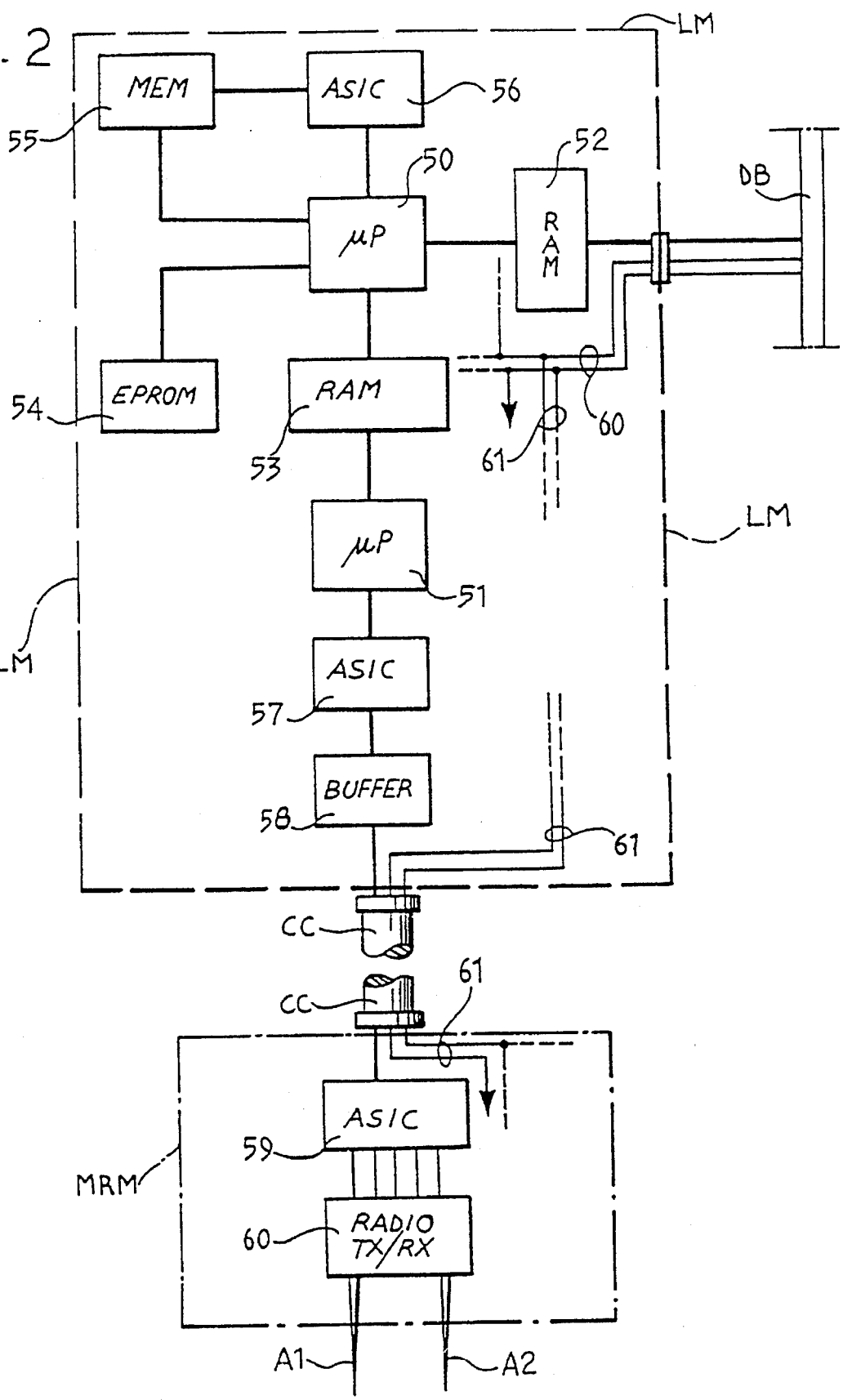
Figure 3:
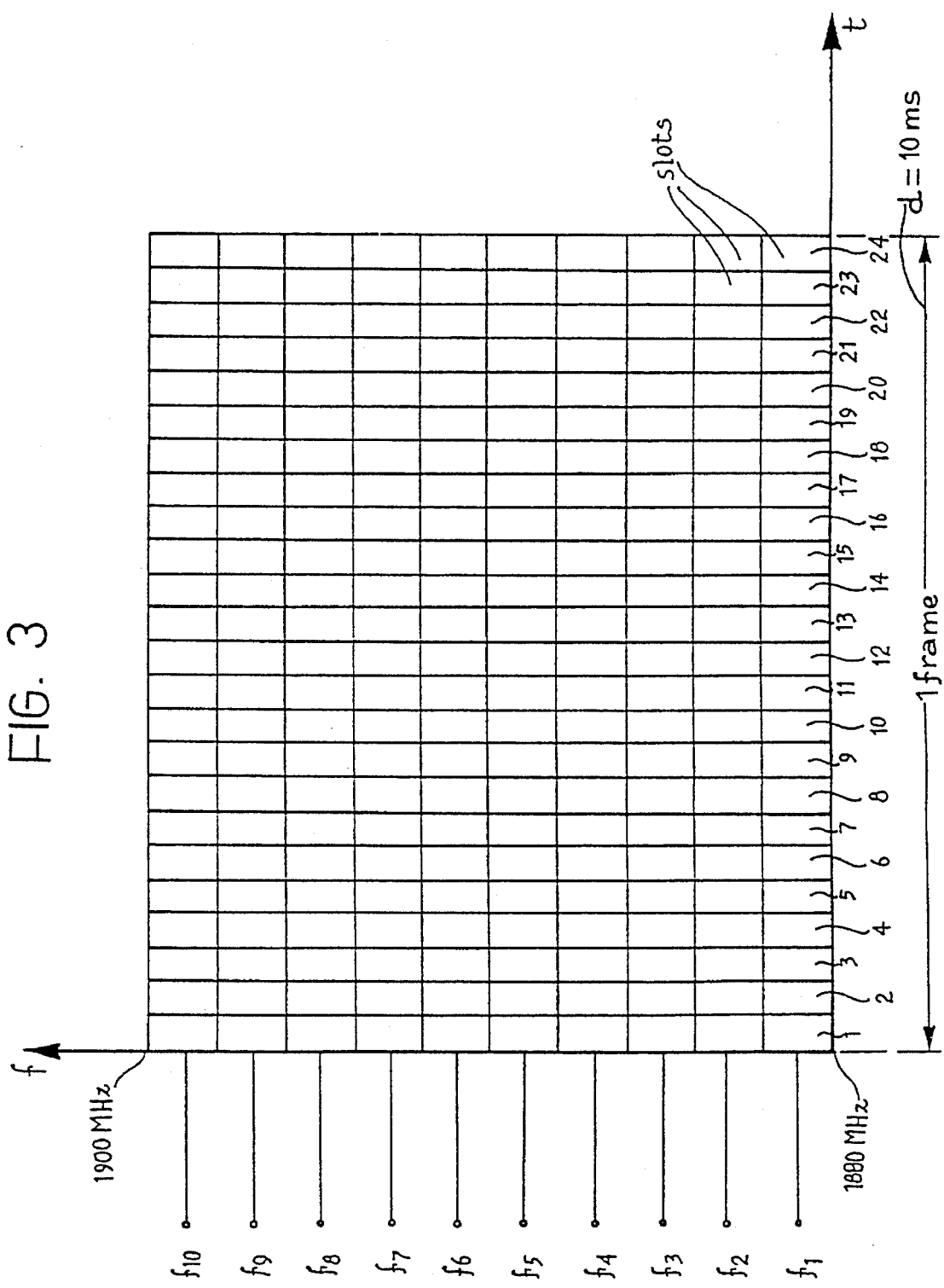
Figure 4:
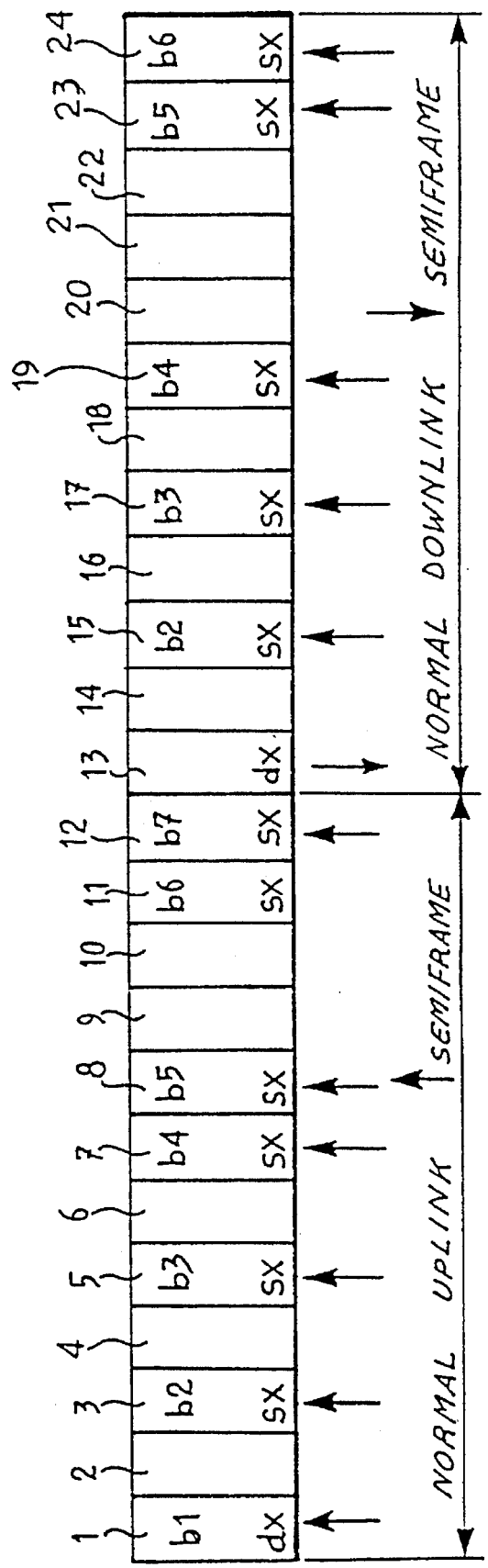

Further characteristics and advantages of the invention will become clear from the following detailed description of a cordless LAN network operating in accordance with the DECT standard, the description being given with reference to the appended drawings, provided purely by way of non-limiting example, in which:

FIG. 1 is a block diagram of the LAN network,

FIG. 2 is a circuit diagram showing the structure of an adaptor and a mobile radio module associated with each data-terminal of the LAN network shown in FIG. 1, FIG. 3 is a time/frequency diagram relating to the manner in which radio transmission is effected according to a hybrid TDM/FDM system in the LAN network of FIG. 1, and FIG. 4 shows an example of a frame for an asymmetric multi-bearer connection which can be formed in the LAN network of FIG. 1.

With reference to FIG. 1, a cordless local area network LAN formed in accordance with the specifications of the DECT standard includes a plurality of user stations T and a fixed central control device, generally indicated C.

Each user station T includes a respective data terminal which, in general, may be constituted by any device, such as a processor, a printer, etc., which can send and/or receive digital data by means of a communications network. In the embodiment shown by way of example in FIG. 1, the data terminals of the user stations T are constituted by personal computers PC having standard network and applications software of the LAN Manager type. The personal computers may, for example, be Olivetti 1/D33 devices, each including a keyboard K, a display screen D and a processing module M.

Each data terminal PC is connected to a respective mobile radio transmitter/receiver (transceiver) module indicated MRM, of a type conforming to the DECT specifications for the physical layer.

The processing module M of each data-terminal PC incorporates a respective microprocessor adaptor device, indicated LM. The microprocessor adaptor is suitable for acting as an interface between the respective data terminal and the associated mobile radio module MRM. For this purpose, as shown schematically in FIG. 2, the microprocessor adaptor LM is connected to the data bus DB of the processing module M of the data terminal. The adaptor LM is also connected to the mobile radio module MRM associated with the data terminal by means of a multicore flexible cable CC (FIG. 1 and 2).

The central control device C includes a multiplicity of fixed radio modules or bases FRM installed in respective predetermined fixed positions for transmitting/receiving packets of data to/from the mobile radio module MRM of one or more user stations T.

The radio bases RB are connected, for example, by electrical wires L, to a microprocessor concentrator MC which is installed in a fixed position and is programmed to control the communications between the user stations T by predetermined procedures and protocols, in accordance with the DECT standard, by means of radio connections established between the mobile radio modules MRM and the radio bases RB.

Preferably, but not necessarily, the concentrator MC may be arranged for connection to a fixed network FN, for example an Ethernet network or a Token Ring or RS 232 network. Concentrators MC of other local networks LAN may possibly be connected to the fixed network.

The integrated system described with reference to FIG. 1 can perform the function of an MAC (medium access control) level multi-port bridge to enable the user stations T to transmit and receive packets of data which are packaged in accordance with the DECT standard format and are exchanged by radio, by means of the fixed portion C of the system. This portion acts as a very rapid packet-switching system and directs the packets received towards the destination user stations or towards the wired network FN.

The system described operates in accordance with the DECT standard. The. DECT standard connection between the user stations T and the fixed portion C of the system replaces only the MAC level of the Ethernet system.

By virtue of the lines L, the radio bases RB can be installed up to distances of the order of 100 meters from the concentrator MC. By carrying out functions, such as connection handover, which are provided for in the DECT standard, almost complete continuity of service between the two or more radio bases RB used can be established.

The concentrator MC may be constituted, for example, by an Olivetti M300 personal computer with an Intel 386Sx processor operating at 16 MHz.

This concentrator incorporates baseband processors BBP connected in an orderly manner to respective associated radio bases RB.

Conveniently, the baseband processors BBP of the concentrator MC and the interface adaptors LM of the user station T may be in the form of half-size format PC circuit boards and, in practice, may conveniently have the same structure at the hardware level and be differentiated only at the software level. The structure of an interface adaptor LM of a user station will be described in greater detail below with reference to FIG. 2.

The concentrator MC as a whole is responsible for controlling the entire system and, in particular:
—the functioning of the high levels of the DECT protocols,
—the control of the various resources of the network,
—the switching of the packets of data, and possibly
—the interfacing between the cordless network LAN and the wired network FN.

The high levels of the DECT protocols provide for services such as fast handover, user authentication and the creation of virtual connections which enable physical connections to be established without massive exchanges of data.

Before the merits of the structure of the functions of the LM devices and of the band base processors BBP are discussed further, some characteristics relating to the mobile radio modules MRM and to the radio bases RB will be set out.

Structurally, the modules MRM and RB are almost identical. As already stated they are transceivers conforming to the DECT specifications for the Physical Layer. In accordance with the DECT specifications, the radio modules operate in the band between 1880 MHz and 1900 MHz on ten channels spaced at 1.728 MHz intervals.

Typically, the modules can instantaneously transmit a power of about 250 mW with an envisaged activity cycle according to the DECT standard of between 4% and 96%.

The modules can transmit signals modulated according to filtered Gaussian FSK which is a non-coherent version of GMSK in which BT=0.5 (BT is the product of the bandwidth B of the filter used and the duration T of the individual symbol).

Radio communications between the MRM modules and the radio bases RM take place according to a hybrid time and frequency multiplex system (TDM/FDM) with double simplex and duplex connections.

Transmission takes place within time cycles or frames having durations d of (for example) 10 ms, divided (for example) into 24 slots, of which, in accordance with the DECT specifications, a first half (12) normally serve for transmissions from the radio bases RB to the portable radio modules MRM and the second half (12) for transmissions in the opposite direction.

FIG. 3 shows the grid of the slots (240) available with ten channels for each frame. In the grid, the time t is indicated on the abscissa and the frequency f is indicated on the ordinate. The frequencies associated with the ten channels are indicated $f_1-f_{10}$ and the slots into which each individual frame is divided are numbered 1–24.

With frames each of 10 ms divided into 24 slots, each slot has a duration of 416.667 μs of which 364.667 μs can be used for a packet of data and 51 μs as a time interval (a guard space).

Conveniently, a time-division duplex (TDD) is used for duplex connections and slots at all the frequencies are used for multiple connections.

The radio modules MRM and RB therefore need to be able to retune themselves between two channels at opposite ends of the band and to switch between transmission and reception within the time interval (the guard space) between two slots.

The receiving portions of the radio modules MRM and of the radio bases RB conveniently have superheterodyne architecture with a single conversion stage.

As is clear from FIG. 1, each radio base RB has a respective antenna A and the mobile radio modules MRM of the user stations each have two antennae A1 and A2 for achieving space diversity in order to improve the quality of the radio connections.

In the embodiment shown in FIG. 2, each interface device LM associated with each data terminal includes a main microprocessor 50 and a signal processor 51.

The main microprocessor 50 which is constituted, for example, by a V40 device produced by Nippon Electric Company, can converse with the bus DB of the associated data terminal by means of a dual-port RAM memory 52 and with the other microprocessor 51 by means of another dual-port RAM memory 53.

The microprocessor 50 is associated with a program memory 54, for example, of the EPROM type and a RAM buffer memory 55 for the data.

The microprocesser 50 and the memory 55 are associated with a device 56 for controlling the interfacing with the memory and decoding the I/O ports. This device is conveniently formed as a large-scale integration ASIC integrated circuit (an application-specific integrated circuit).

The microprocessor 51 is a device for processing digital signals, for example, a TMS320 device produced by Texas Instruments and is programmed to control low-level MAC functions such as the formatting and deformatting of the frames and of the slots, the synchronisation of slots and frames, the detection of errors, the scanning of the communication channels, etc.

The processor 51 is also connected to a device 57 which extracts the clock signals from the signals received by the mobile radio module MRM and generates the timing signals and also effects any coding for protecting the data to be transmitted. The device 57 may also conveniently be produced in the form of a single ASIC integrated circuit.

This device is associated with a buffer 58 which acts as a protection latch. The processor 51 is connected by means of the buffer and the multicore cable CC to a device 59 within the mobile radio module MRM for controlling the radio transmission/reception circuits 60. The device 59 may also conveniently be produced in the form of an ASIC integrated circuit.

Conveniently, the device LM draws its electrical supply from the bus DB of the data terminal, for example, by means of the two conductors indicated 60 in FIG. 2. Moreover, the electrical supply of the mobile radio module MRM to advantage is derived from that of the adaptor device LM, for example, by means of two conductors indicated 61 in FIG. 2, which extend through the multicore interconnecting cable CC.

As stated above, from a hardware point of view, the baseband processors BBP of the concentrator device MC have the same structure as the logic modules LM fitted in the data terminals of the user stations T. In fact most of the functions of the baseband processors correspond to functions carried out by the modules LM. These functions include, in particular:
— the creation and dismantling of the slot structures,
— the creation and dismantling of logic channels,
— the monitoring of the free channels in the incoming communications,
— the propagation of "connectionless" and "paging" messages,
— handover between logic and "inter-cell" channels,
— the control of rapid procedures for detecting and correcting errors.

The interface adaptors LM of the data terminals are arranged also to perform the following functions:
— the creation and updating of a map of the usage of the physical communications channels and the selection of the channel for each connection to be established, and
— the decision to effect either intra-cell or inter-cell handover and the initiation thereof.

The adaptor modules LM also act as interfaces between the DECT environments and the applications environments of the respective data terminals. The module LM thus responds to the network operating system (the LAN manager) resident in the data terminal in exactly the same manner as an Ethernet network adaptor by means of a Microsoft Network Driver Interface Specification standard interface.

Two critical requirements for the application of the DECT specifications in a local area network LAN are the need to use the spectral resources with maximum efficiency and the need to minimise the delay introduced by the DECT. In order to achieve both these objectives, it is necessary to use specific protocols.

Since the data traffic is characterised by short transactions interposed between long silences it is inconceivable to keep the connections between the user stations and the radio bases open permanently since they would be massively underused. The radio connections are therefore established in the network only when there are data to transmit and are closed during periods of inactivity in order to free radio channels for use by other users.

For this purpose, the main processor 50 of each module LM is programmed to operate in the following manner.

Each time data are admitted to the buffer memory 55 for transmission by means of the associated mobile radio module MRM, the main microprocessor 50 sets up a radio connection by means of the microprocessor 51 (with a radio base determined in the manner which will be described below and with the use of slots of a channel or frequency determined in the manner which will also be described below). The radio connection thus opened is maintained throughout the time necessary for the transmission of the data in the memory 55. After the data have been transmitted the radio connection is not closed immediately but is kept open for a predetermined period of time. Conveniently, the main microprocessor 50 is arranged to process a short-term statistic relating to the communications traffic of the data terminal (for example, over a period of half an hour or an hour). The radio connection opened for the transmission of data is then closed with a delay after the moment at which the transmission of data is completed, the delay being determined adaptively on the basis of the mean traffic which has affected the data terminal. This reduces useless periods since, in many cases, it is not necessary to reopen the radio connection when a further flow of data arrives for transmission.

In order to select the radio base with which to establish the connection, each user station adaptor module LM operates in the following manner.

In accordance with the DECT standard, the main microprocessor 50 of the adaptor (LM) of each user station is arranged cyclically to scan all the slots of all the channels by means of the associated mobile radio module MRM in order to detect the level of the signal emitted by each fixed radio base RB in each slot for each channel or frequency. On the basis of the levels of the signals thus detected, the microprocessor 50 can establish which is the nearest fixed radio base RB. The processor is also arranged, during the scanning, to decode the signals indicative, for each slot, of the radio base RB which is (possibly) active.

By virtue of this "mapping" in order to transmit data, the main processor 50 of the device LM of each user terminal can select the nearest radio base of which not all the slots are occupied at the time in question.

This procedure avoids futile attempts to establish a radio connection with a radio base which, although it is the nearest, is fully occupied at the time in question.

In accordance with the DECT standard, the baseband processors BBP of the concentrator device MC are arranged to scan the channels or frequencies $f_1$–$f_{10}$ cyclically by means of the associated radio bases RB. In particular, the scanning takes place in synchronism with the cyclical scanning effected by the devices LM of the user terminals. Moreover, the main processors 50 of the interface adaptor modules LM are arranged to carry out the scanning one channel in advance. In other words, if, in the course of their scanning, the fixed radio bases RB are "interrogating" the channel or frequency $f_i$, at the same moment, the mobile radio modules are "interrogating" the channel or frequency $f_{i+1}$.

This minimises the time needed to establish a radio connection between a user terminal and a fixed radio base.

Conveniently, the main processors 50 of the interface adaptors LM of the user stations and the baseband processors BBP of the concentrator MC are arranged to carry out the DECT Multibearer and Asymmetric Connection procedures in order to determine in which slot to transmit.

The multibearer procedure enables several slots (bearers) to be assigned simultaneously to the connection associated with a single user station. The bandwidth available for a user station may thus be increased from, for example, 32 kb/s duplex (single bearer) up to (theoretically), for example, 384 kb/s duplex with all twelve pairs of slots (12 bearers) in use.

Since the traffic in a local area network is typically very asymmetrical with the need to have considerable bandwidths available in one direction in particular, the DECT specifications include mechanisms which enable the uplink and downlink slots of a connection to be used in a single direction. A connection of this type must form part of a multibearer connection in which at least one other connection remains duplex to provide a route for control data in the opposite direction. The result is that a user can access almost the whole of the bandwidth (352 kb/s) by occupying half of the slots as shown in FIG. 4, which relates to an asymmetric multibearer connection (5, 1).

Finally, the software used in the network LAN conveniently includes procedures for detecting and correcting errors in accordance with the DECT specifications. The specifications provide for, at the level 2 (MAC/DLC), some mechanisms which have been developed appropriately for this purpose, and the main characteristics of which are the following:

—the MAC provides a service defined as an "Ip" (a protected information channel) with a throughput of 25.6 kb/s per connection and an error factor of $10^{-5}$; this service is based on a retransmission mechanism which is quick and simple by virtue of the use of a single window packet;

—the DLC (data link control) provides a service defined as "Frame Relay" which protects the data against any errors introduced during handover and connection changes and against residual errors of the Ip channel.

Naturally, the principle of the invention remaining the same, the forms of embodiment and details of construction may be varied widely with respect to those described and illustrated purely by way of non-limiting example, without thereby departing from the scope of the present invention.

We claim:

1. A cordless local area network (LAN) for radio communications of data between a plurality of user stations (T), through a central control device (C), each user station (T) comprising a mobile radio module (MRM), an adaptor device (LM) and a data terminal (PC) having a data bus (DB), said adaptor device (LM) (PC) being connected to said mobile radio module (MRM) by a flexible multicore cable (CC) and to said data bus (DB), said central control device (C) comprising a plurality of radio bases (RB) installed in respective predetermined fixed positions for providing cordless two-way communications of said data with said mobile radio modules (MRM) and a microprocessor concentrator (MC) connected to said radio bases (RB) by connecting lines (L), said adaptor device (LM) comprising:

—activating/de-activating means for activating/de-activating said cordless two-way communications, —a buffer memory, and —a main microprocessor which is connected to said data bus (DB), to said buffer memory (55), and to said activating/deactivating means, said main microprocessor being operable to control the exchange of said data with said data bus (DB) in a predetermined manner, to store said data into said buffer memory, and to pilot said activating/de-activating means in such a manner that said cordless two-way communications are activated each time said data are stored in said buffer memory and are kept open for a determined period of time after the transmission of said data has been completed.

2. A local area network according to claim 1, wherein said main microprocessor is arranged to determine said determined period of time on the basis of a communications traffic statistic relating to said data terminal (PC) associated to said adaptor device (LM) and calculated over a predetermined period of time.

3. A local area network according to claim 1 in which said radio communications between said mobile radio modules (MRM) and said radio bases (RB) take place according to a mixed time and frequency multiplex system (TDM, FDM) on n channels or frequencies ($f_1$–$f_{10}$) within a predetermined band with time cycles of predetermined duration, divided into a predetermined number (2m) of time slots, and in which said main microprocessor is arranged to scan said predetermined number of time slots (2m) by said n channels ($f_1$–$f_{10}$) cyclically through the associated mobile radio module (MRM) and to detect the level of the signal emitted by each of said radio bases (RB) in each slot for each channel or frequency and thus to determine which radio base (RB) is nearest to said user station (T);

said main microprocessor being also operable, during the scanning, to decode the signals indicative of the radio base (RB) which is active in each slot and to select—in order to transmit data—the nearest radio base (RB) for which not all the slots are occupied.

4. A local area network according to claim 3, wherein said microprocessor concentrator (MC) includes a plurality of baseband processors (BBP) each of which is associated with and connected to a respective radio base (RB), said baseband processors (BBP) being arranged to scan the transmission channels or frequencies ($f_1$–$f_{10}$) cyclically, in accordance with a predetermined sequence, through said respective radio bases (RB), and wherein said main microprocessors of the adaptor of said user stations (T) are arranged to scan the transmission channels or frequencies ($f_1$–$f_{10}$) in synchronism with said baseband processors (BBP) but one channel in advance thereof.

5. A local area network according to claim 4, wherein said main microprocessors of said user stations (T) and said baseband processors (BBP) of said microprocessor concentrator (MC) are arranged to effect multibearer and asymmetric connection procedures in order to determine the slots in which to transmit.

6. A local area network according to claim 1, wherein each of said mobile radio modules (MRM) have a pair of antennae (A1, A2) for achieving space "diversity".

7. A local area network according to claim 6, wherein each fixed radio base (RB) has a single antenna (A).

8. A cordless local area network (LAN) for radio communications of data between a plurality of user stations (T) through a central control device (C) wherein said central control device (C) comprises:

—a plurality of radio bases (RB) installed in respective predetermined fixed positions; and —a microprocessor concentrator (MC) connected to said plurality of radio bases (RB);

wherein each one of said user stations (T) comprises:

—a data terminal (PC) having a data bus (DB);

—an adaptor device (LM) connected to said data bus (DB); and

—a mobile radio module (MRM) connected to said adaptor device (LM);

and wherein said interface adaptor device (LM) comprises:

activating/de-activating means for activating/deactivating a cordless two-way connection between said mobile radio module (MRM) and said central control device (C);

—a buffer memory; and a main microprocessor, connected to said data bus (DB), to said buffer memory and to said activating/de-activating means;

said main microprocessor being operable for firstly loading said dam from said data bus (DB) to said buffer memory; secondly piloting said activating/de-activating means to activate said cordless two-way connection then to transmit said data to at least one of said user stations (T) and to keep open said cordless two-way connection for a determined period of time after said data have been transmitted.

9. A local area network according to claim 8 wherein said radio communications between said mobile radio modules (MRM) and said radio bases (RB) take place according to a mixed time and frequency multiplexed system (TDM, FDM) on n channels or frequencies ($f_1$–$f_{10}$) within a predetermined band with time cycles of predetermined duration, divided into a predetermined number (2m) of time slots, and wherein said main microprocessor is arranged to cyclically scan said predetermined number of time slots (2m) by said n channels ($f_1$–$f_{10}$) through the associated mobile radio module (MRM) for detecting the level of the signal emitted by each of said radio bases (RB) in each of said time slots for each of said n channels and then for decoding the signals indicative of said time slots, whereby said main microprocessor determines the nearest radio base (RB) having at least one of said time slots free, in order to transmit said data.

10. A local area network according to claim 9, wherein said microprocessor concentrator (MC) comprises a plurality of baseband processors (BBP) each of which is connected to an associated radio base (RB); wherein said baseband processors (BBP) are arranged to scan said n channels ($f_1$–$f_{10}$) cyclically, in accordance with a predetermined sequence, through said associated radio bases (RB); and wherein each one of said main microprocessors of said user stations (T) is arranged to scan through said mobile radio modules (MRM) said n channels ($f_1$–$f_{10}$) in synchronism with said baseband processors (BBP) but one channel in advance thereof.

11. A local area network according to claim 10, wherein said main microprocessors of said user stations (T) and said baseband processors (BBP) of said microprocessor concentrator (MC) are arranged to determine the number of time slots to be assigned to said cordless two-way connection and the number of time slots to be assigned for transmitting said data; whereby said main microprocessors of said user stations (T) and said baseband processors (BBP) of said microprocessor concentrator (MC) effect multibearer and asymmetric connection procedures.

12. A local area network according to claim 8, wherein each of said mobile radio modules (MRM) has a pair of antennae (A1, A2) for achieving space "diversity".

13. A local area network according to claim 12, wherein each of said radio bases (RB) has a single antenna (A).

14. A local area network according to claim 8, wherein said microprocessor concentrator (MC) comprises exchange means for exchanging data with a further local area network Ethernet, Token Ring or RS232.

15. A method for exchanging data between a plurality of user stations (T), through a fixed central device (C) by utilizing a multifrequency band divided into a plurality (n) of channels ($f_1$–$f_{10}$) and into a predetermined number of time slots (2m); said method comprising the steps of:

—periodically emitting by means of said fixed central device (C) both a synchronization signal for each one of said plurality (n) of channels ($f_1$–$f_{10}$) and a logical signal for each one of said time slots (2 m);

—periodically scanning by means of said plurality of user stations (T) said synchronization signal and said logical signal in order to detect the signal level of each one of said plurality (n) of channels ($f_1$–$f_{10}$) and respectively which time slots (2 m) are free or occupied;

—creating and periodically updating by means of each one of said user stations (T) a map representative of said signal level and of the free time slots;

—setting up a radio connection between a selected one of said user stations (T) and said fixed central device (C) only when said selected user station (T) has data to exchange;

—exchanging said data between said selected user station (T) and said fixed central device (C) by selecting from said map the free time slots having the signal level with the best signal to noise ratio.

16. A method according to claim 15 further comprising the step of:

—keeping open said radio connection for a determined period of time when the exchange of said data has been completed.

17. A method according to claim 16 wherein said determined period of time is determined adaptively, on the basis of communications traffic statistic relating to said selected user station (T), and calculated over a predetermined period of time.

18. A method according to claim 15 further comprising the step of:

—carrying out multibearer and asymmetric connection procedures by enabling a plurality of slots of said predetermined number of time slots (2 m) to be assigned simultaneously to said radio connection.

\* \* \* \* \*